(12) United States Patent
Doshi et al.

(10) Patent No.: US 12,282,403 B2
(45) Date of Patent: Apr. 22, 2025

(54) STABLE TRANSFORMATIONS OF NETWORKED SYSTEMS WITH AUTOMATION

(71) Applicant: Intel Corporation, Santa Clara, CA (US)

(72) Inventors: Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/484,253

(22) Filed: Sep. 24, 2021

(65) Prior Publication Data

US 2022/0012149 A1 Jan. 13, 2022

(51) Int. Cl.
*G06F 11/30* (2006.01)
*G06F 8/65* (2018.01)
(Continued)

(52) U.S. Cl.
CPC ............ *G06F 11/3051* (2013.01); *G06F 8/65* (2013.01); *G06F 11/0757* (2013.01);
(Continued)

(58) Field of Classification Search
CPC .................. G06F 8/65; G06F 9/45558; G06F 2009/4557; G06F 2009/45595;
(Continued)

(56) References Cited

U.S. PATENT DOCUMENTS

2017/0060705 A1* 3/2017 Sridhara ............. G06F 11/1662
2023/0230097 A1* 7/2023 Burnett ............... G06F 11/0745
707/703

OTHER PUBLICATIONS

Mark, "Setting up infrastructure automation", [Online]. Retrieved from the Internet:https: mynetarch.wordpress.com2020 05 24 setting-up-infrastructure-automation , (May 24, 2020), 5 pgs.
(Continued)

*Primary Examiner* — Matthew M Kim
*Assistant Examiner* — Matthew N Putaraksa
(74) *Attorney, Agent, or Firm* — Schwegman Lundberg & Woessner, P.A.

(57) ABSTRACT

Various methods, systems, and use cases for a stable and automated transformation of a networked computing system are provided, to enable a transformation to the configuration of the computing system (e.g., software or firmware upgrade, hardware change, etc.). In an example, automated operations include: identifying a transformation to apply to a configuration of the computing system, for a transformation that affects a network service provided by the computing system; identifying operational conditions used to evaluate results of the transformation; attempting to apply the transformation, using a series of stages that have rollback positions when the identified operational conditions are not satisfied; and determining a successful or unsuccessful result of the attempt to apply the transformation. For an unsuccessful result, remediation may be performed to the configuration, with use of one or more rollback positions; for a successful result, a new restore state is established from the completion state.

25 Claims, 14 Drawing Sheets

(51) Int. Cl.
  *G06F 11/07*    (2006.01)
  *G06F 11/14*    (2006.01)
  *G06F 11/22*    (2006.01)
  *G06F 11/36*    (2006.01)
  *G06F 11/362*   (2025.01)
  *G06F 11/3668*  (2025.01)

(52) U.S. Cl.
  CPC ........ *G06F 11/142* (2013.01); *G06F 11/2273* (2013.01); *G06F 11/362* (2013.01); *G06F 11/3692* (2013.01)

(58) Field of Classification Search
  CPC ............. G06F 11/3051; G06F 11/0757; G06F 11/142; G06F 11/2273; G06F 11/362; G06F 11/3692
  See application file for complete search history.

(56) References Cited

OTHER PUBLICATIONS

Marty, Michael, "Snap a Microkernel Approach to Host Networking", SOSP 2019, Huntsville, ON, Canada, (Oct. 2019), 15 pgs.

\* cited by examiner

STABLE TRANSFORMATIONS OF NETWORKED SYSTEMS WITH AUTOMATION

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Change consistently occurs within compute networks provided by data center clouds or edge computing clouds, especially as a result of hardware and software changes. Applications are increasingly delivered and upgraded with high velocity, with A/B testing, blue-green deployments, and canary testing applied to accelerate time to value from new features, performance, security, scaling, and other improvements. Automation of tools and software development lifecycle increasingly provide a push-button interaction between a solution developer and the cloud infrastructure for developers to reduce cycle times from code changes to feature releases. Due to the prevalence of such improvements, there remains a heavy burden of ensuring resilient, safe and secure network operation when updates and upgrades are attempted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
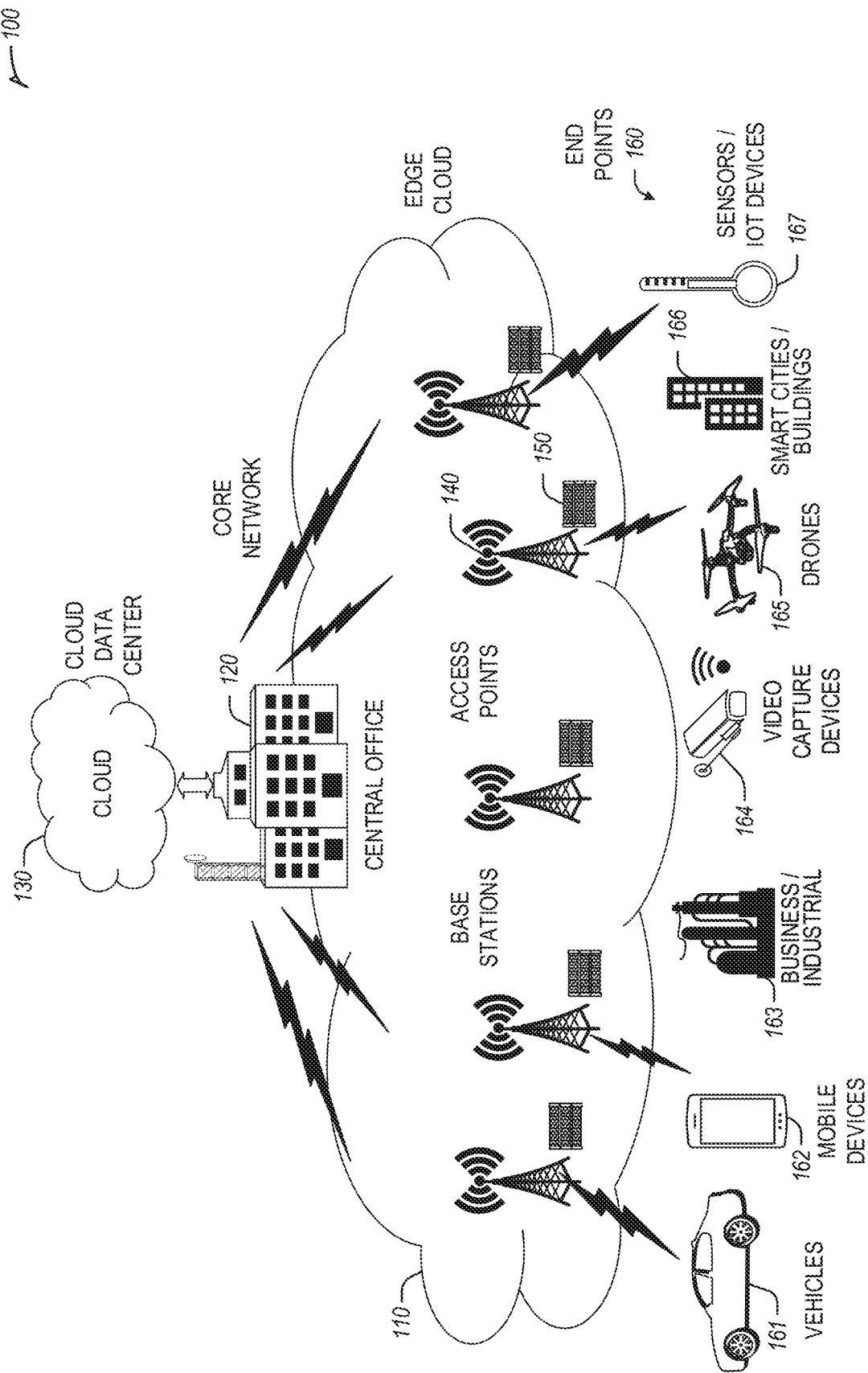
FIG. 1 illustrates an overview of an edge cloud configuration for edge computing.

The following embodiments generally relate to aspects of applying, verifying, and handling computing system transformation procedures such as upgrades, updates, and the like. The approaches provided by these embodiments contributes towards maximizing stability and assurance through the automation of transformation procedures. These approaches further enable test automation to be atomic with application of the transformation steps using automatically-executing smart-contracts. The smart contracts, applied at each level of a hierarchy of ingredients, effectively guarantee that a transformation has negligible probability of leaving networks of machines in non-productive states—which might otherwise happen due to bugs or breaches that are discovered when changes become live at a large cluster level.

The following features may be used to assist the stable operation—and resulting high availability—of many configurations of computing systems and computing system clouds. Among other benefits, these features enable transformation procedures without requiring human involvement, to provide for an improved way of keeping network transformations incremental and frequent. This also provides an ability to return to a healthy state autonomously and in a self-healing manner when there are bugs or issues present. This has the beneficial side effect of enabling frequent small changes instead of infrequent large changes.

Unlike application software changes, the transformation of network devices, hosts, software, and systems, transformations effect not just the behaviors and characteristics of the ingredients in isolation but more importantly affect the interactions that flow between the ingredients and the security requirements governing those interactions. As the scale of cloud computing solutions become large and as enterprises move larger portions of their computing onto cloud provisioned infrastructures, availability, resiliency, and security all become dependent on making network configuration changes as resilient and worry-free as possible. In addition to changes in topology, algorithmic changes in the form of network protocols, and, nodal changes in the form of software and hardware upgrades are becoming very common. Likewise, other changes are increasing such as: disaggregation of capabilities, additions and deletions of devices, racks, clusters, availability-zones, etc.

An imperative for modern cloud-based computing is that the applications that run on these large scale networked systems do not experience ups and downs in the performance and availability of systems on which they run and communicate. In furtherance of this goal the disclosure below describes a systematic way to ensure that a complex sequence of updates that together comprise an aggregate transformation is performed step by step. This enables basic and advanced testing to be performed integrally by moving from one step to the next, and to recover similarly by moving back from a failed advance to a previous step. The updates at each step include a hierarchy of hardware ingredients, from devices, to hosts in which those devices reside, the networks, etc., and similarly, hierarchies of software ingredients from firmware to OS to higher level libraries.

A variety of technical benefits and implementations will be apparent from the presently disclosed approaches for monitoring and handling transformations within computing systems. Additional details on these and other features of computing systems are provided after the following overview of cloud and edge computing systems.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
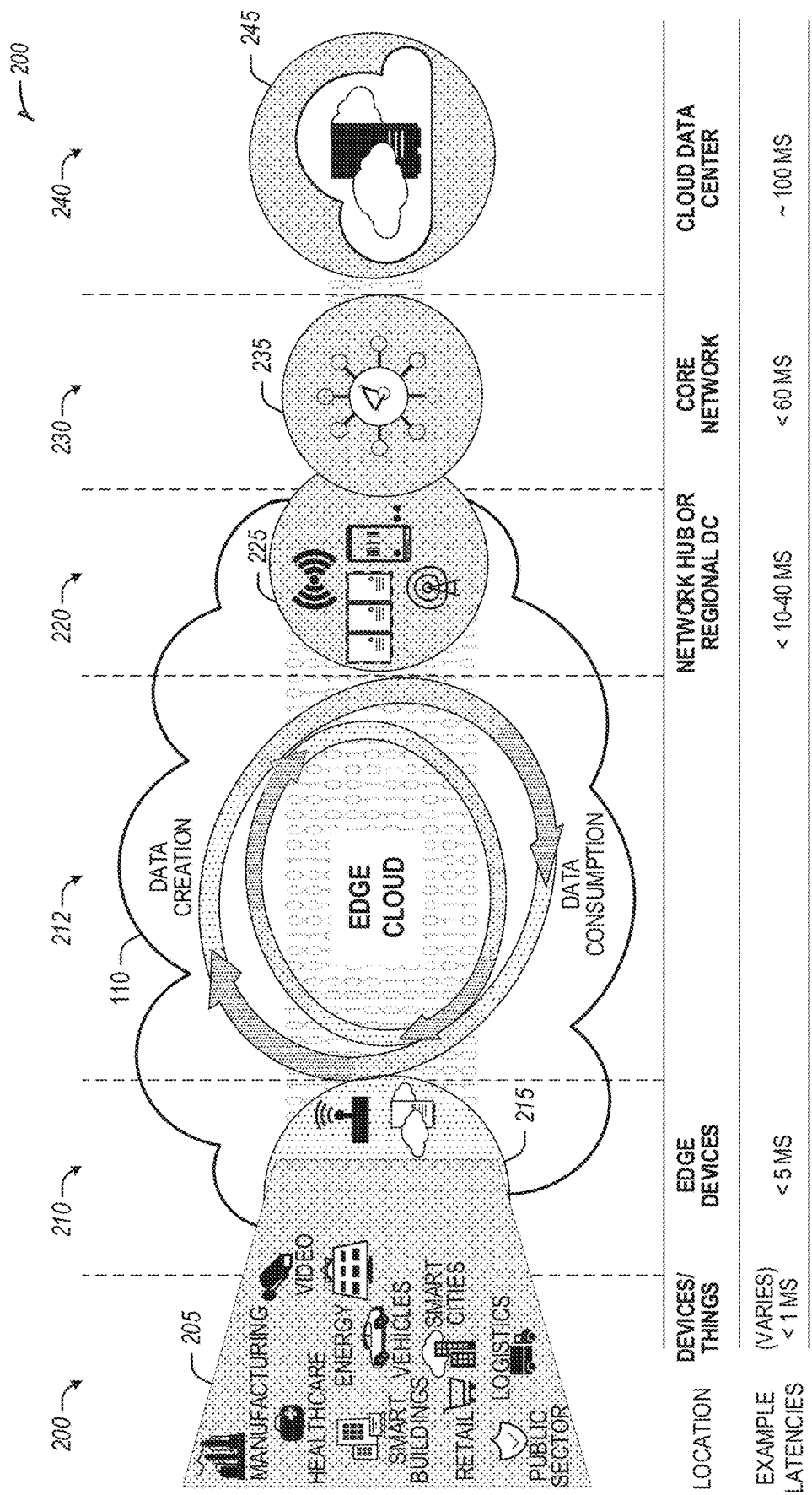
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be hosted among one or more appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
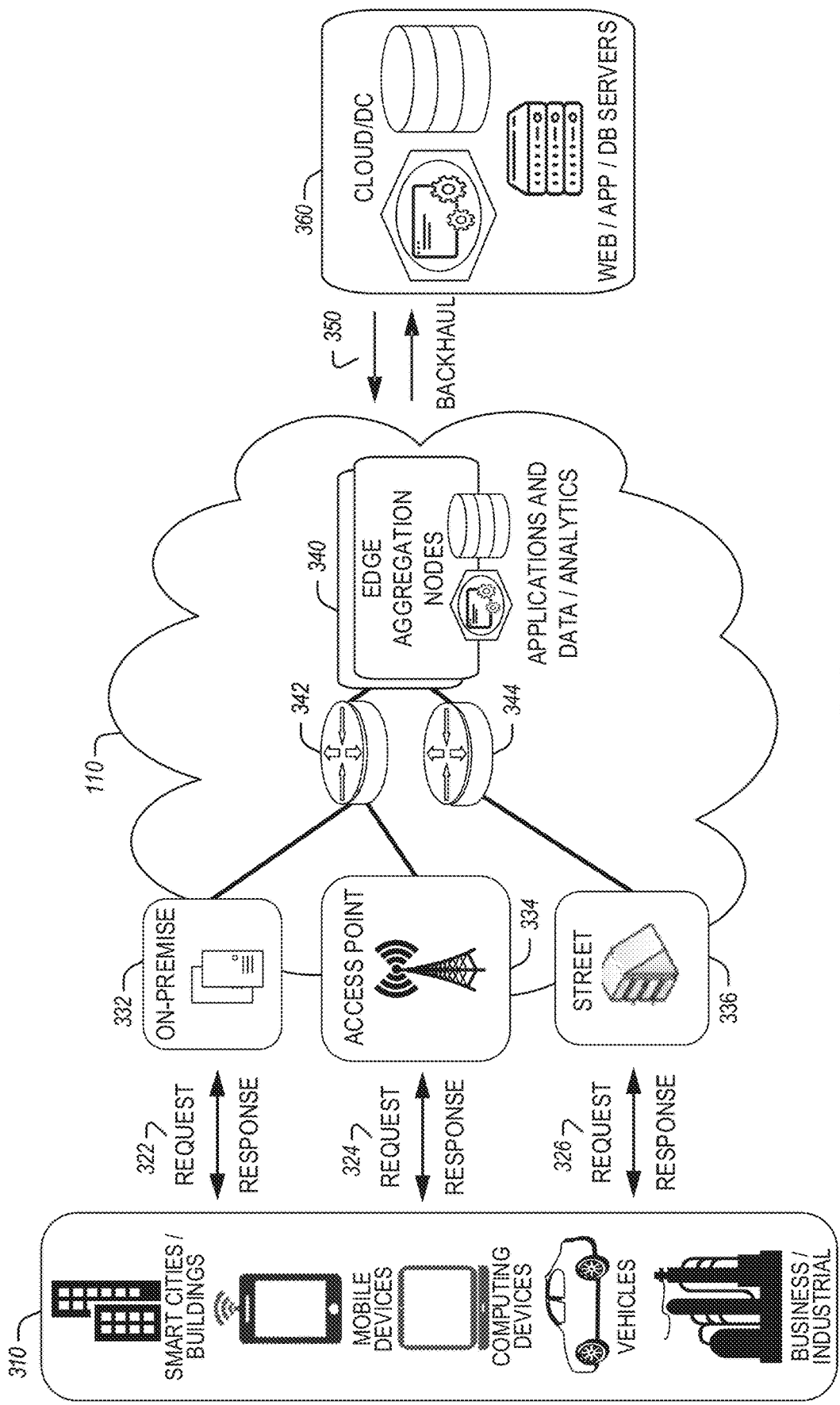
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
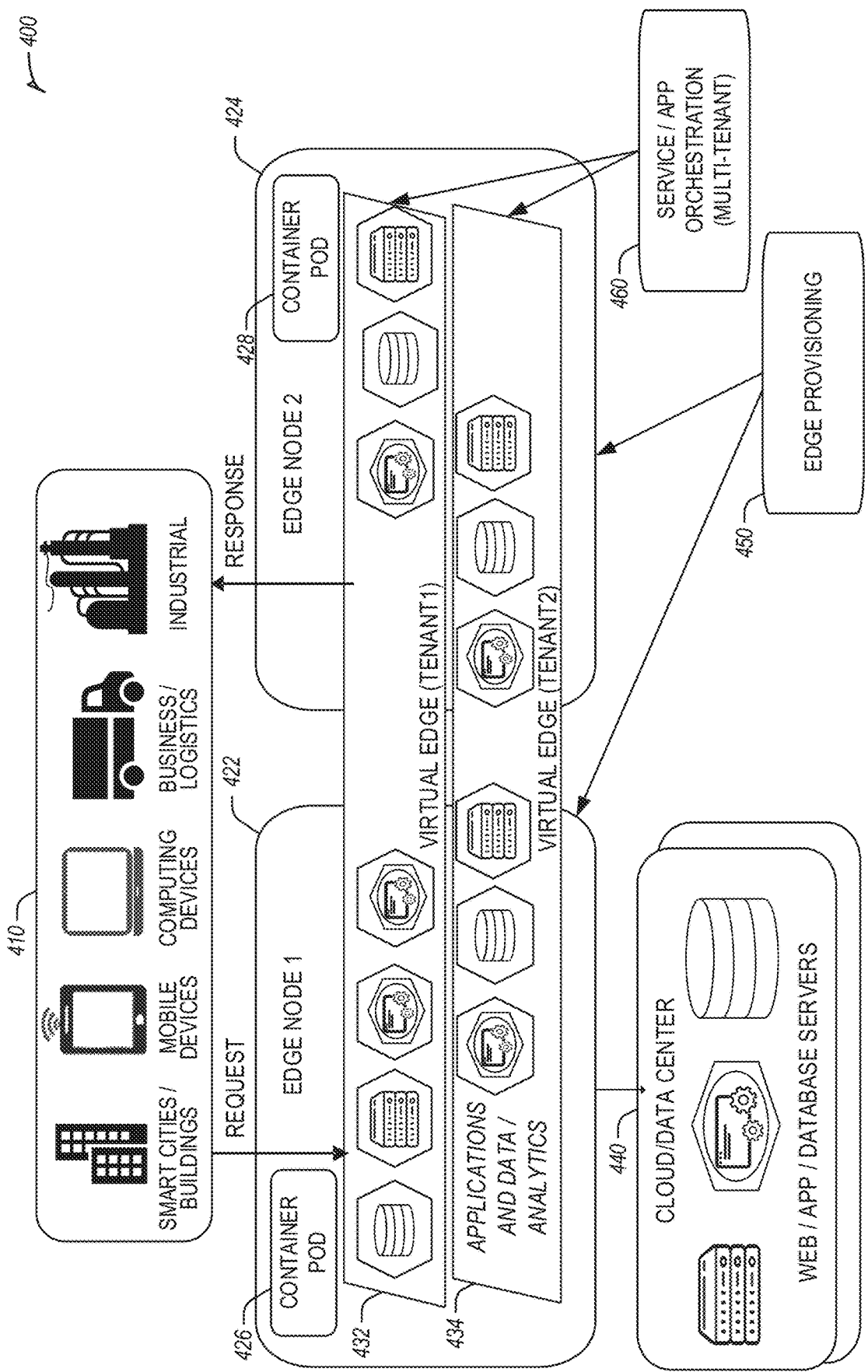
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants.

Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
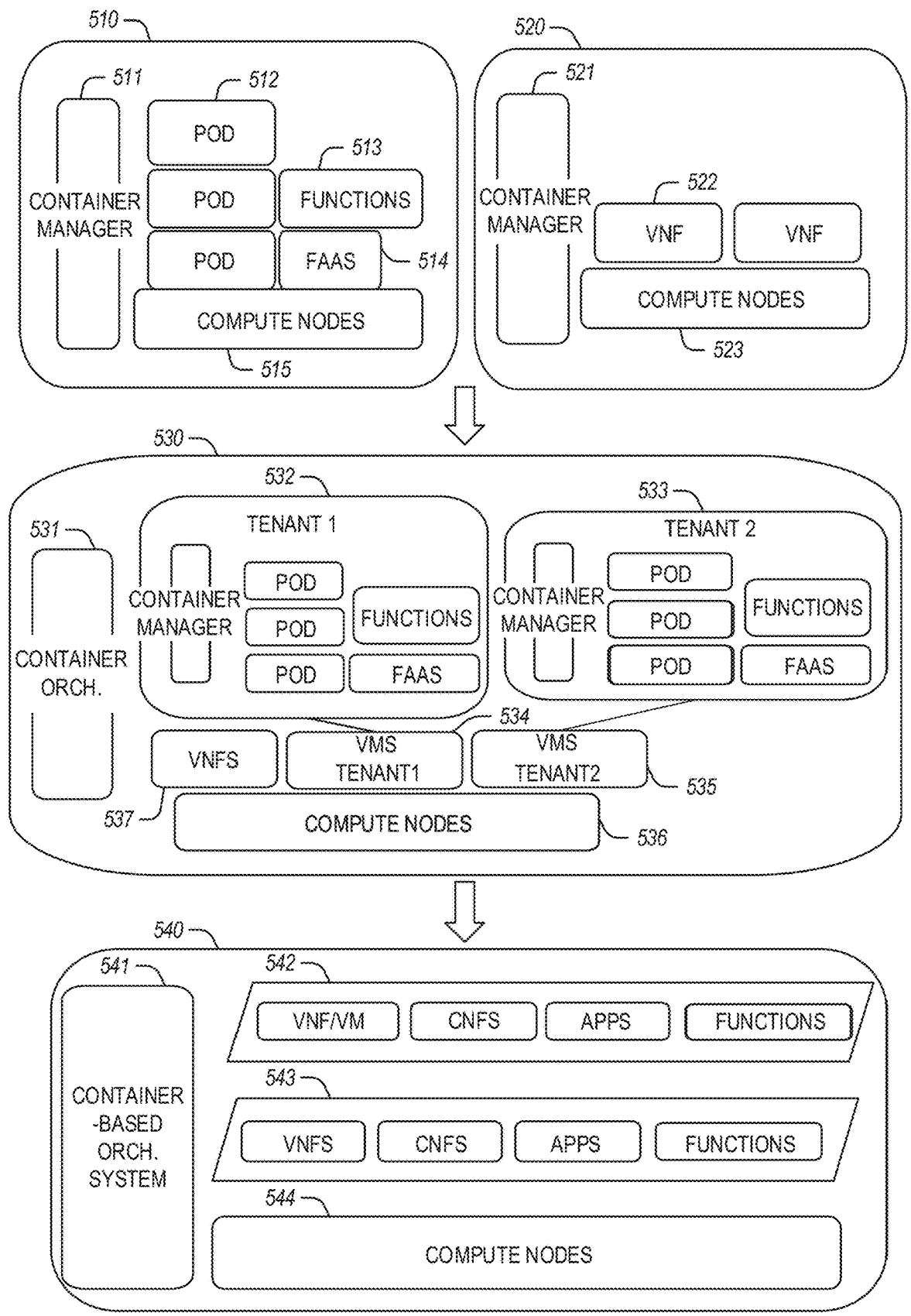
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 536), where containerized pods (e.g., pods 512), functions (e.g., functions 513, VNFs 522, 537), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
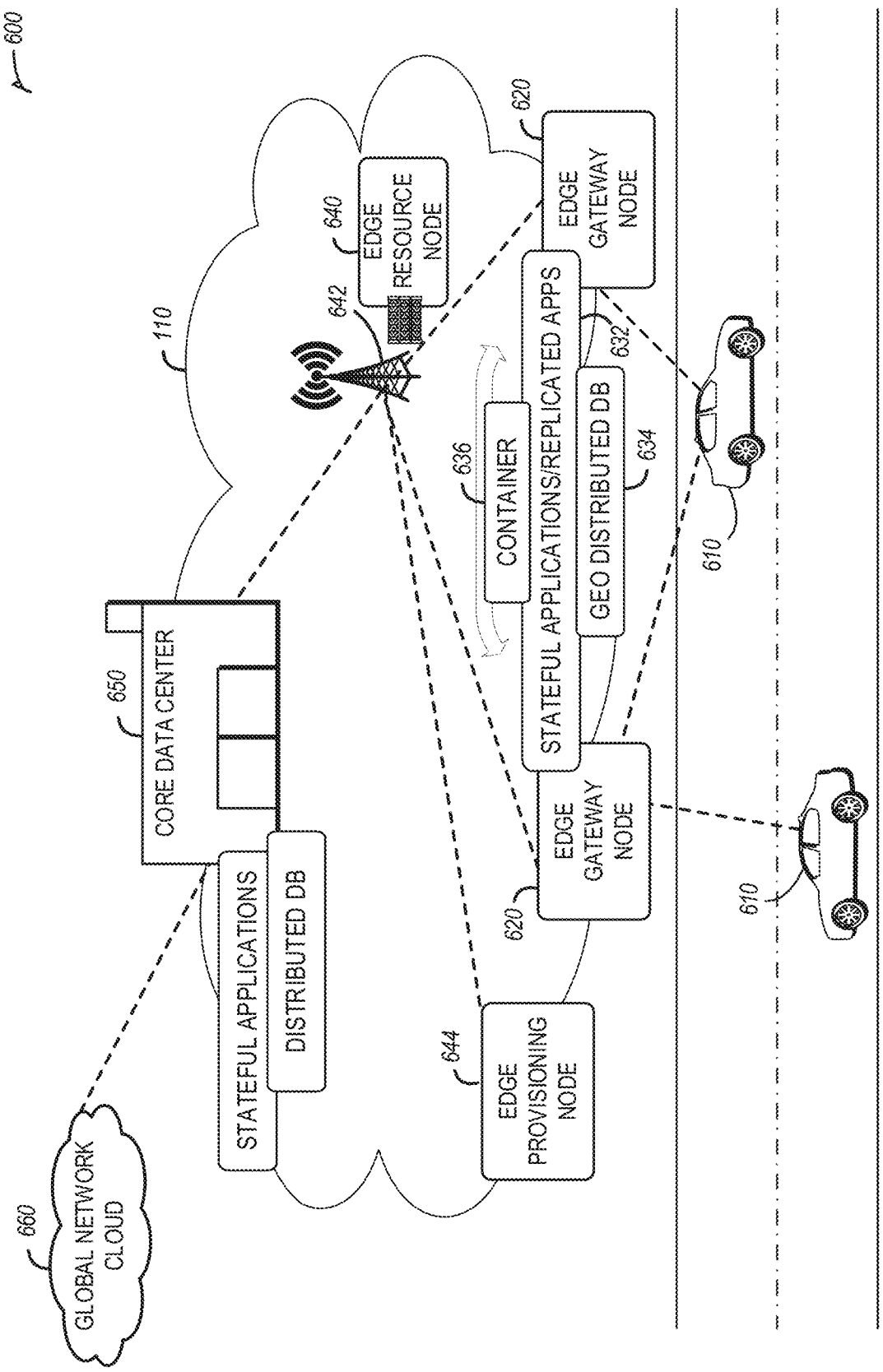
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
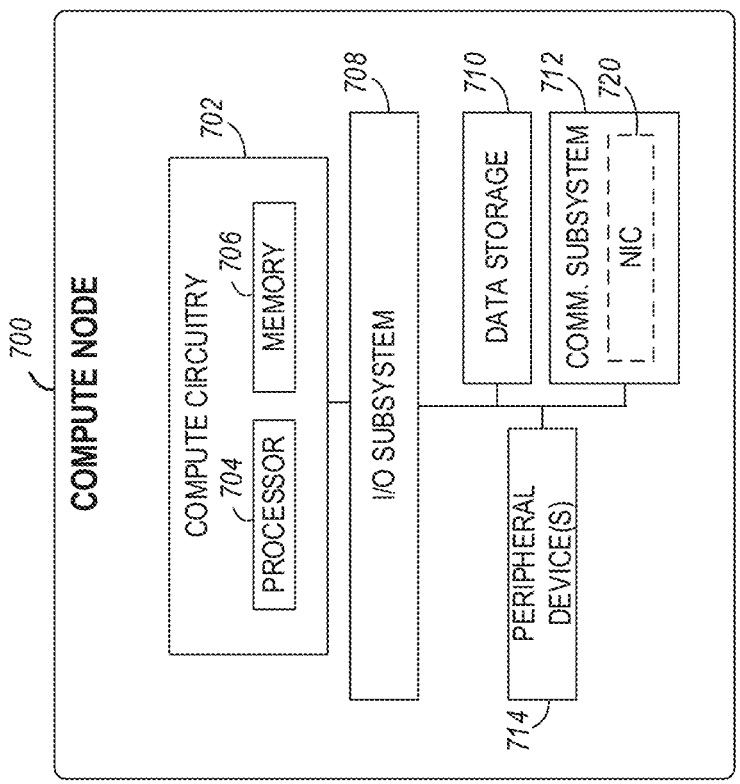
FIG. 7A illustrates an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.)

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured or adapted for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured or adapted to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LP-WAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
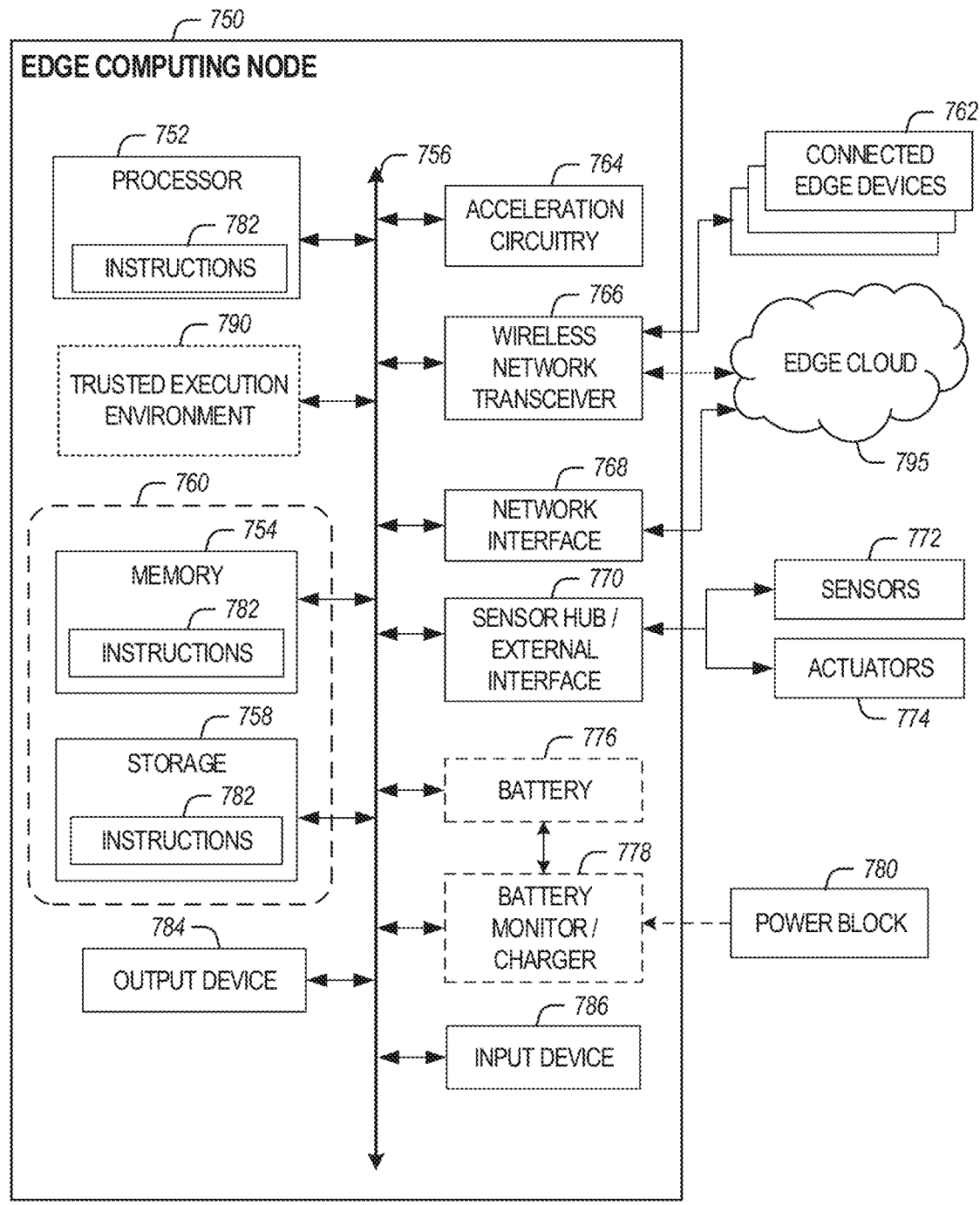
FIG. 7B illustrates a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured or adapted as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured or adapted for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure or instantiate execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 7C:
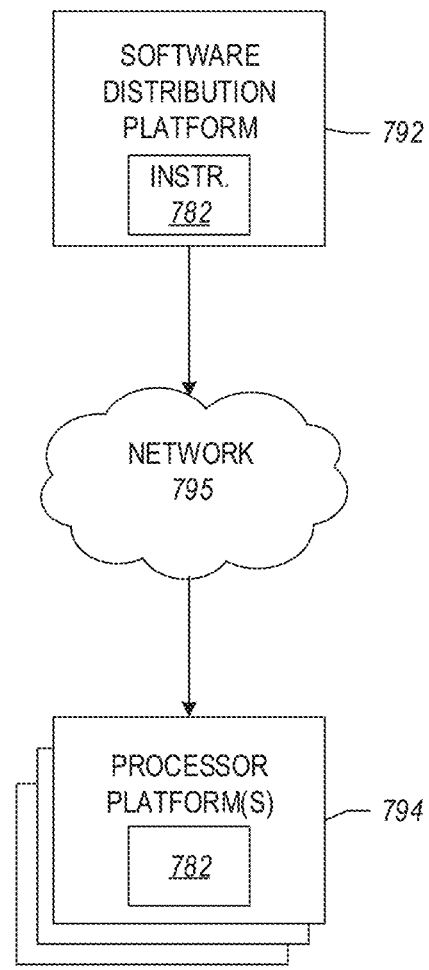
FIG. 7C illustrates an example software distribution platform in an edge computing system.

FIG. 7C illustrates an example software distribution platform 792 to distribute software, such as the example computer readable instructions 782 of FIG. D1, to one or more devices, such as example processor platform(s) 794 and/or example connected edge devices 762. The example software distribution platform 792 may be implemented by any computer server, data facility, cloud service, etc., capable of storing and transmitting software to other computing devices (e.g., third parties, the example connected Edge devices 762 of FIG. 7B). Example connected edge devices may be customers, clients, managing devices (e.g., servers), third parties (e.g., customers of an entity owning and/or operating the software distribution platform 792). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7C, the software distribution platform 792 includes one or more servers and one or more storage devices. The storage devices store the computer readable instructions 782, which may correspond to the example computer readable instructions of FIG. 7B, as described above. The one or more servers of the example software distribution platform 792 are in communication with a network 795, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 792. For example, the software, which may correspond to the example computer readable instructions 782 of FIG. 7B, may be downloaded to the example processor platform(s) 792 (e.g., example connected Edge devices), which is/are to execute the computer readable instructions 782 to implement the transformation monitoring and response techniques discussed herein. In some examples, one or more servers of the software distribution platform 792 are communicatively connected to one or more security domains and/or security devices through which requests and transmissions of the example computer readable instructions 782 must pass. In some examples, one or more servers of the software distribution platform 792 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 7C, the computer readable instructions 782 are stored on storage devices of the software distribution platform 792 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 792 are in a first format when transmitted to the example processor platform(s) 794. In some examples, the first format is an executable binary in which particular types of the processor platform(s) 794 can execute. However, in some examples, the first format is uncompiled code that requires one or more preparation tasks to transform the first format to a second format to enable execution on the example processor platform(s) 794. For instance, the receiving processor platform(s) 794 may need to compile the computer readable instructions 782 in the first format to generate executable code in a second format that is capable of being executed on the processor platform(s) 794. In still other examples, the first format is interpreted code that, upon reaching the processor platform(s) 794, is interpreted by an interpreter to facilitate execution of instructions.

As will be understood from the preceding overview, a variety of types of upgrades, changes, and adaptations ("transformations") may occur within the computing and networking infrastructure of an edge cloud or cloud setting. Developers and system integrators may intend that automation of such infrastructure transformations to be performed in parallel to the changes from application software development; but the changes to infrastructure often require many points for human-in-the-loop involvement. This means that most of the infrastructure software, networking and security protocol changes, firmware upgrades, etc. are highly planned and controlled events so that they do not contribute chaos, or disrupt performance or availability of applications. It is common for example, for most infrastructure changes to go through grueling cycles of performance evaluation, penetration testing, chaos engineering, etc., before they are gated into production systems, where additional canary, A/B testing, etc. may continue in order to build higher levels of confidence. As a result, transformations in infrastructure, especially those in networking, are either not undertaken frequently; or are performed with high levels of investment budgeted for their execution.

Network transformations—such as in the form of new network software or protocols, new network-device behaviors, host OS, or driver changes—all taken together represent a level of risk much greater than that of updating user level software applications (even complex applications). As a result, even automation that would be generic in nature, needs to be combined with additional fail-safe techniques for bringing production systems back into specific operational conditions when something runs aground, and the network is left in a partial state from which it needs to be extricated.

Prior approaches for attempting to automate network transformations have included use of a network automation pipeline, such as with the use of NetCICD. As a high level summary, during the development stage, NetCICD involves ensuring that changes made into a lab environment are pushed to source control; this triggers orchestration environment to boot a controlled test setup (in lab) for each component; and to load deployment and test scripts, followed by test execution. If tests fail, the setup is halted and a human expert takes over to debug. Later, for deployment into a production environment, the flow is as follows: a merge request triggers code/config review (or verification/ validation by another team), then is picked up by an orchestrator such as Jenkins, which notifies a configuration tool such as Ansible; Ansible then gets the new config and runs it, and does so in check mode.

The use of NetCICD and similar existing solutions does not go far enough to be truly scalable in hyperscale cloud systems nor sufficiently low risk. Large cloud service providers have complex considerations beyond just automation of the continuous integration and continuous delivery (CI/ CD) flow. Additionally, the use of NetCICD is not particularly different in any significant way than normal CI/CD flows for software applications. The testing and "checked mode" production testing in a NetCICD flow is designed for one-shot transitions from a previous configuration to a new configuration (which reflects an implicit assumption that a change is not too complex in scope).

Thus, in conventional approaches, the heavy burden of ensuring resilient, safe and secure network operation (post-update) is met in part by provisioning for redundancies in paths and by overprovisioning computational resources as alternative infrastructures to which operations can failover. Further, proactive validation in the form of long soak-cycles of testing are performed. These approaches increase cost and reduce agility. Further, conventional approaches do not address the biggest difficulty when networks are not in the same administrative domain; or when testing and acceptance criteria differ between departmental networks—such as, engineering computing vs. business computing. For complex upgrades with existing systems, human beings have to extensively plan and activate a rollout of the change sequences piecemeal in order to maintain overall stability of operations; and with human-in-loop approaches, the time to accomplish complex transformations rises rapidly, as, taken together, human-in-loop and security checkoffs necessarily limit the mechanization of the flow. These and other limitations are addressed by the following approaches.

Figure 8:
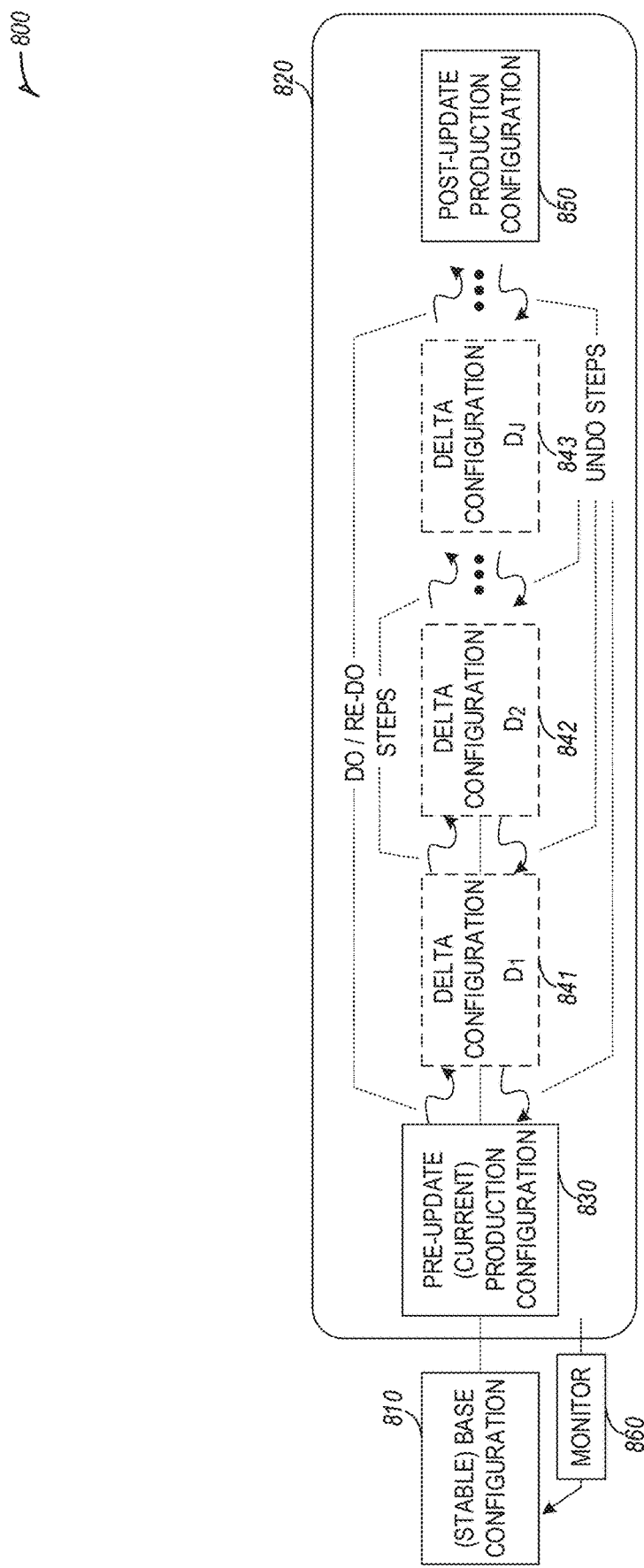
FIG. 8 illustrates an overview of an architecture for implementing stable transformations in networked systems, according to an example.

FIG. 8 illustrates an overview of an architecture 800 for implementing stable transformations in networked systems. Here, a migration environment 820 supports migrating from an initial state (shown as "Pre-update Production Configuration" 830) to a final state ("Post-update production configuration" 850) at each element. This migration proceeds by a punctuated evolution from one stable state to the next by determining a delta between the configurations (shown as "Delta Configurations $D_1$" 841, "Delta Configurations $D_2$" 842, "Delta Configurations $D_j$" 843, etc."). Each transition in this punctuated evolution results in the elements being able to establish network connectivity, and being able to run several basic tests and advanced tests.

Tests can fail in a variety of ways, and depending on the nature of the test and that of the failure, a policy decision may be made to stop and reverse course. By reversing course, either (A) the system or network or device is returned to the Pre-update Production Configuration 830 or (B) is returned to a previous incremental stable state (e.g., one of the configurations 841, 842, 843), in order to retry tests that may have failed earlier due to transient reasons.

It is possible that during applying or attempting to apply the transformations, the system, device, or the network protocol ends up in a state from which forward or backward movement becomes impossible to guarantee. When such a situation develops, then recovery consists of reinitializing the system to boot into a fully working safe configuration. This is performed through the agency of a Monitor 860 which detects that the system has placed itself into such a situation, and now needs to be brought into a reinitialized rather than repaired state. This reinitialized state is identified as a (Stable) Base Configuration 810.

In an example, the full sequence of transitions and the tests that need to be performed in each intermediate step of the transition are tied to the execution of a hierarchy of smart contracts that ensure that no transition is complete without either being successful or having successfully initiated a recovery action. The integration of these processes into a smart-contract based flow ensures that transformations that fail due to unintentional or malicious interference do not cause uncontrolled outages.

In more detail, the Stable Base Configuration 810 is defined for the system as a type of safety net (i.e., a special configuration that exists as a fallback). The Stable Base Configuration 810 is used if the network gets into a problem configuration that makes devices, hosts, etc. to either become unresponsive or erratic. This Stable Base Configuration 810 can be entered at each ingredient (e.g., individual hardware or software component) simply by shutting down, reconfiguring, and restarting that ingredient (at the hardware level) and rebooting the driver, the host OS, or the networking software components—instead of relying on live reconfiguration of the component in an active state of its interaction with peer entities in the network.

When the sequence of operations in a single or multistep transformation runs aground and cannot be reliably moved in either undo or redo directions, the Monitor 860 initiates this restart/reboot. Because, in many cases, software itself may be unresponsive, the Monitor 860 may initiate restarts through hardware signals (including power-cycle commands), and the Monitor 860 may operate as a service that is not itself dependent on network operations in order to perform a distributed command.

It will be understood that the configuration of FIG. 8 may apply to any network system, node, host, component or entity, which experiences a transformation. For instance, actions may be performed for the preparation of the stable base at each host in a network. The stable base preparation may be performed ahead of time for each host. Such configuration and actions may be particularly relevant to use within a computing cluster.

As an example, candidate operating system and drivers for a stable base configuration of a cluster may be built in a lab or preproduction environment. This is very similar to normal practice of creating "gold" versions of software for general release, such as an OS distribution that includes all drivers and various common utilities that are part of a server host or guest VM image.

Figure 9:
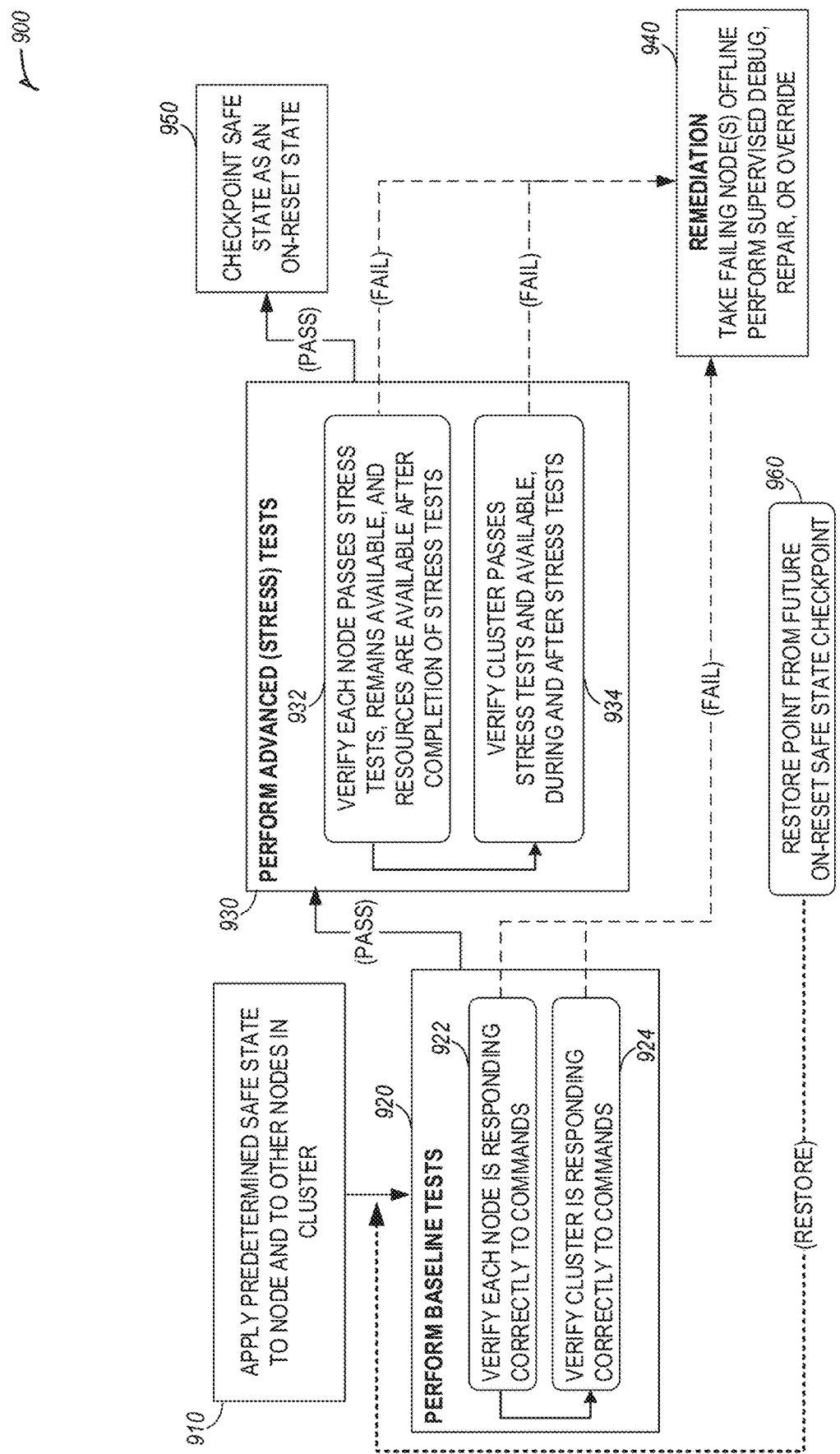
FIG. 9 depicts a testing and remediation protocol applicable for use with a cluster computing system, according to an example.

FIG. 9 depicts a testing and remediation protocol 900, applicable for use with a cluster computing system. As shown in FIG. 9, the candidate OS (or other predetermined safe state) is installed on all nodes in a cluster (operation 910), and then cluster setup scripts are executed to complete the desired network at the host level. A set of baseline tests run (test operations 920), starting by verifying that each node is responding correctly to commands (test operation 922) and concluding by verifying that the cluster is responding to commands (test operation 924), such as with a verification script that ensures that the cluster is free of any memory leaks, reservation leaks, etc. Similarly, the protocol 900 follows with a set of advanced tests (test operations 930); the advanced tests may include verifying that each node passes the stress test, remains available, and that resources remain available after completion of stress tests (test operation 932). Such tests are expected to press high levels of stress on network ingredients and on host hardware and protocol stacks. This may be followed by verifying that the cluster passes the stress test, and that the cluster is available during and after the stress tests (test operation 934). For example, during and after the advanced tests, daemons verify that connectivity is not lost, and no resource leaks develop. If all tests pass, the total configuration is checkpointed as an in-field verified configuration (operation 950). If any errors develop, remediation may occur (operation 940). Typically the failed system(s) are taken offline, while the remaining host systems are captured in a checkpoint. Various approaches for offline debug, analysis, can be used to handle the failed systems.

As shown, a restore point from a future on-reset safe state checkpoint may be established (operation 960) and used for restore operations. Once the safe base software has been established as healthy, it is preserved at each host in a pre-assigned storage or persistent memory partition.

Figure 10:
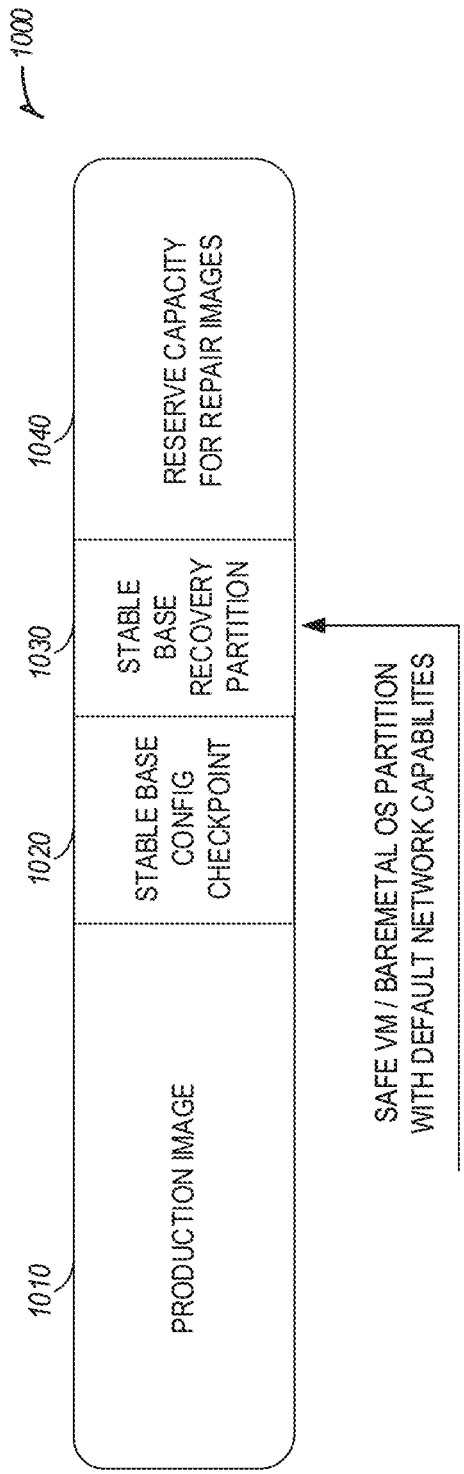
FIG. 10 illustrates configurations for partitions including use of a Stable Base Recovery Partition, according to an example.

FIG. 10 depicts an example of a pre-assigned storage or persistent memory partition 1000, including a Stable Base Recovery Partition (SBRP) 1030. The remainder of the host's software or data may be in the production image partition 1010, while various device, network protocol, and any other scripts for integrating this host into the latest network topology are placed in a checkpoint partition 1020. Storing the recovery software and tested configuration data locally permits the host to be able to restart locally without depending on network boot or network install. Although these examples of partitions are described relative to data and software partitions, it will be understood that the partitions also may be associated with or established for hardware or compute resources.

In an example, partition 1010 may store a more current version of the production environment; this partition may provide the "Pre-update (current) production version" 830 referenced from FIG. 8. Any other checkpoints may be stored locally or elsewhere in a network. A reserve partition 1040 provides the host with any ephemeral storage it may need without disturbing the contents of partition 1010 at a later time.

Figure 11:
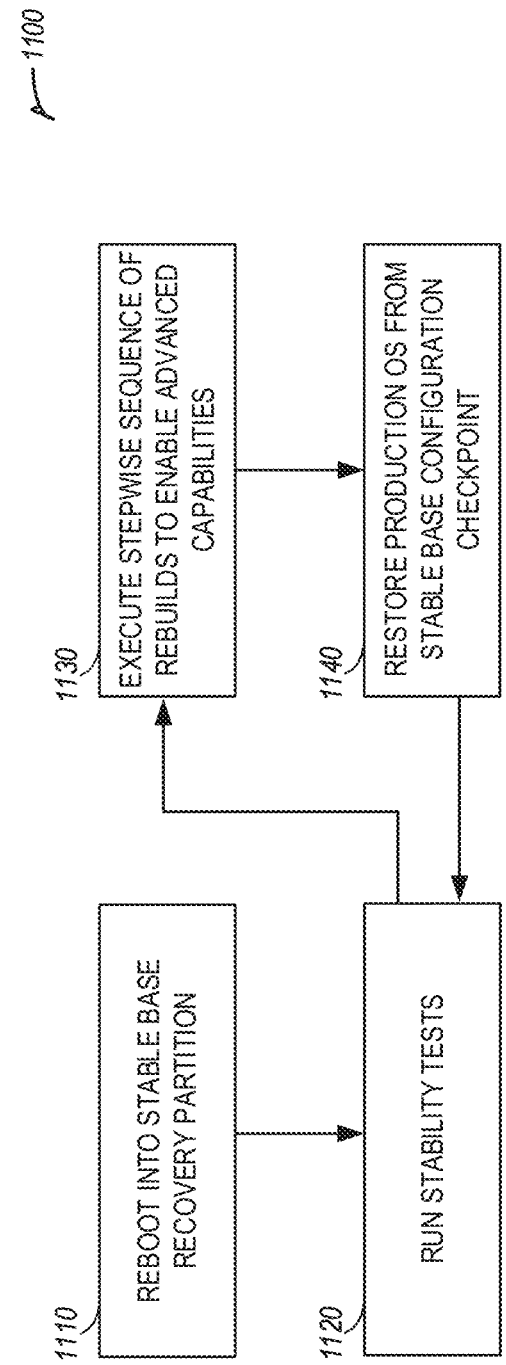
FIG. 11 illustrates a summarized version of a restoration flow, with use of a Stable Base Recovery Partition, according to an example.

FIG. 11 depicts a summarized version of a restoration flow 1100. This restoration flow 1100 follows the operations depicted FIG. 9 from a restore operation 960, such as after a reset/reinitialize flow occurs due to a monitor action (from the Monitor 860 of FIG. 8). The objective is to first restore a system to the stable base configuration 810 and verify that it performs correctly in stable base configuration 810, and then attempting a set of advanced forward configuration steps to bring it to a pre-update configuration 830.

In sum, each host (1) starts in the safety net configuration (e.g., reboots 1110 into the stable base recovery partition 1030), (2) verifies that basic and advanced tests do not fail or produce instabilities (e.g., with stability tests 1120)—which are performed with a set of default features or modes of device operations in each of the hosts. Next with the help of scripts and utilities from partition 1020, a target operational configuration (execution 1130) is created—which may, in general require selective enabling of various advanced capabilities such as built-in encryption or compression, new match-action operations, etc. and lead to restoring to configuration 830.

Then, the prepared new configuration is restored into (or "updates") the potentially faulty or corrupted production image (checkpoint 1140). The stability tests (basic, advanced) are re-executed, to validate that the hosts and their device configurations are performing stably. At regular intervals, the SBRP image may move forward (with high confidence established through repeated testing) so that over time, the stable base image in the SBRP partition is very close in its functionality to a pre-update production image and configuration 830.

Figure 12:
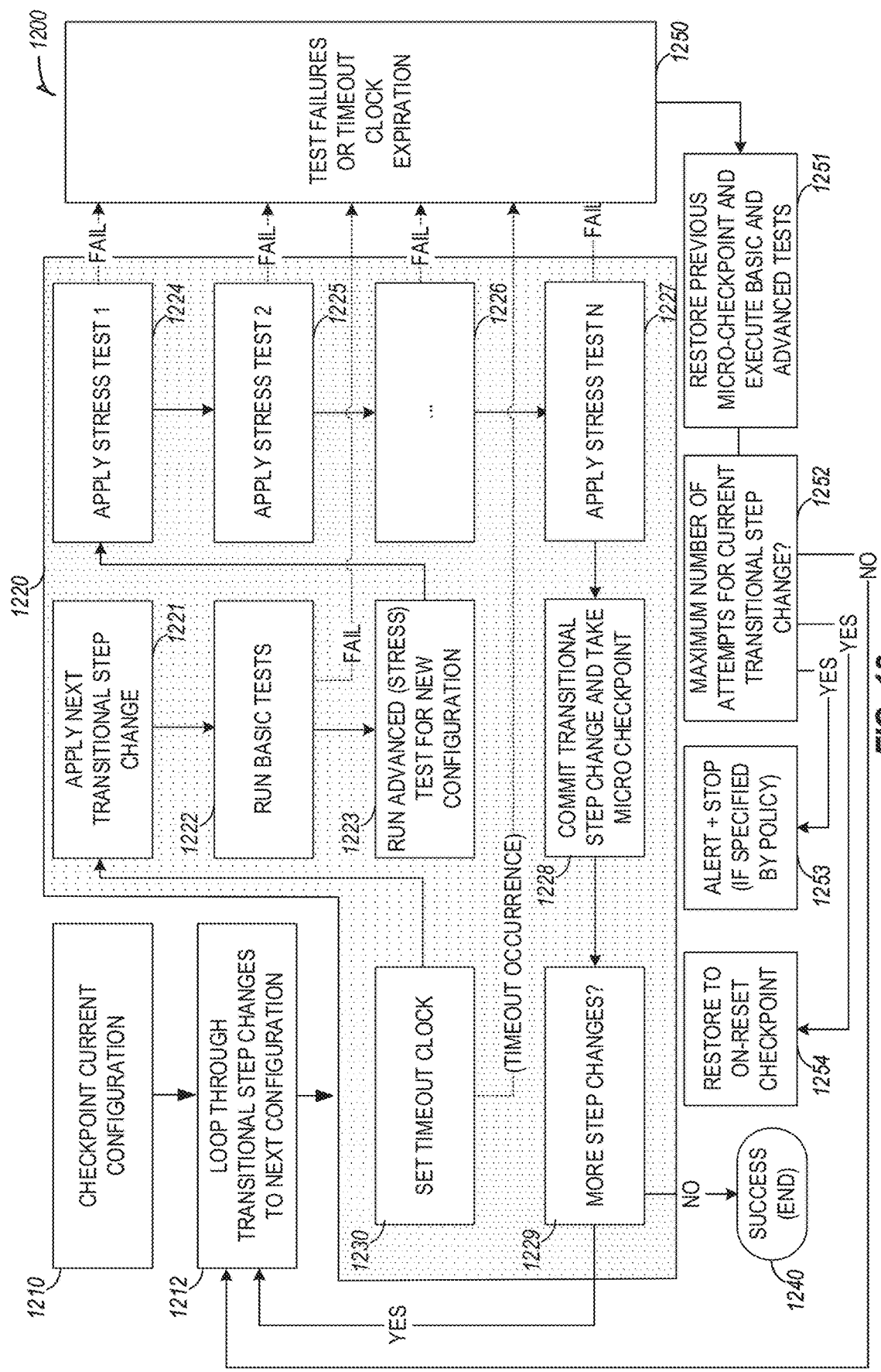
FIG. 12 illustrates a flowchart providing a transformation sequence, according to an example.

FIG. 12 depicts a flowchart 1200 with a sequence of transformation 1220 summarized at a high level, such as when applied in the architecture shown in FIG. 8. The current (pre-update) configuration is saved as a checkpoint (operation 1210) at the start of the flowchart 1200.

For each intermediate step in the sequence of transformation 1220 (started with a loop 1212), a timeout clock (set with clock operations 1230) provides for a signal to a monitor that can take an out-of-band action (operation 1250). This signal may be triggered if the next transitional step in the progression (operation 1221) causes a host or a device to become non-responsive, or some bug causes a missed wakeup and wedges software processes.

Next, basic tests (operation 1222) are performed, and following that, advanced (stress) tests (operation 1223) are performed. Such advanced tests may include a sequence of stress tests or other testing operations (operations 1224, 1225, 1226, 1227). If successful, then the current transitional step is committed (operation 1228), and a micro checkpoint (incremental checkpoint) is taken, and the process continues to the next incremental step (operation 1229). If more step changes are available, then the loop continues (operation 1212), whereas if no more step changes are available, then success (operation 1240) is reached.

In the event of test failures or tests timing out at any point (failure operation 1250), a monitor takes control and restores the previous micro-checkpoint (operation 1251). Such a monitor may execute the basic and stress tests, and then again attempt to continue forward.

If a maximum number of iterations or attempts have happened (operation 1252) and failures/hangs continue to occur, then one of two actions is performed (e.g., as dictated by a policy): either an alert is provided (operation 1253) so that a person or other entity can take control and debug; and in this case, the network operations, and indeed the cluster itself are frozen so that it is possible for a person or persons to examine the system state without valuable evidence being lost. Alternatively, another policy may be employed, in which the cluster is returned to the stable base configuration (operation 1254) so that it can be brought forward to the original (pre-update) configuration after verifying that the ability to return to the stable base configuration itself has not been compromised by some bug. This ensures that if for some reason, the checkpoint of the pre-update configuration itself cannot be restored from due to some hardware or configuration corruption, then at least the system/network can remain available in the stable-base configuration until some later time when someone can take manual control of the process. This kind of error condition should be very rare and therefore it is reasonable to exercise a more rigorous process of going back to the stable base before continuing forward to restore the pre-update operating conditions.

At least one of the basic tests in flows of FIGS. 11 and 12 may be used to verify signatures of what is installed if a signature is present, or to record that a signature is to be generated. It can be an error to either have a signature that does not match a measurement, or have no signature and no flag set to say that the signature needs to be generated in a post-install flow after the basic tests have finished. Each signature verification as well as each act of signature production generate a secure logging event.

It will be understood that the techniques discussed above may be extended through the use of a number of hardware improvements and operational settings. In an example, a trusted execution environment (e.g., Intel Software Guard Extensions (SGX) or Trust Domain Extensions (TDX)) may be operated as the host for coordination of a smart contract for automation.

In another example, a SmartNIC or IPU based computational island may act as both a monitor and an initiator of boundary actions, and as a collector and signer of smart contracts completing inside devices (which are not reached by the TEE). Note, however, that a SmartNIC and an IPU may be themselves trusted and verified by the TEE coordinator.

In a further example, SmartNIC or IPU based trusted components are used to perform the automatic derivation (construction, composition) of tests, from a high level specification of the tests to be performed. This test specification is used, since this derivation will need to be specific to hardware and software ingredients that are not compile time knowns to the developers of the tests.

In a further example, a stable base recovery partition itself is signed and immutable and stored locally and remotely. Further, its signature may be registered into a management network's secure vault so that a security attack cannot compromise the base state.

Additionally, a monitor process may be provided with access to a hardware capability by which it can initiate a hard reset through a background path into a non-responsive host. Since this is likely to be rarely exercised, a broadcast based protocol is sufficient for reaching the affected machine, instead of a protocol that requires routing. A local element receiving a secure wireless signal for such receiving a wireless notification and acting on it is also a reasonable alternative to a wired means of performing this rare action.

Figure 13:
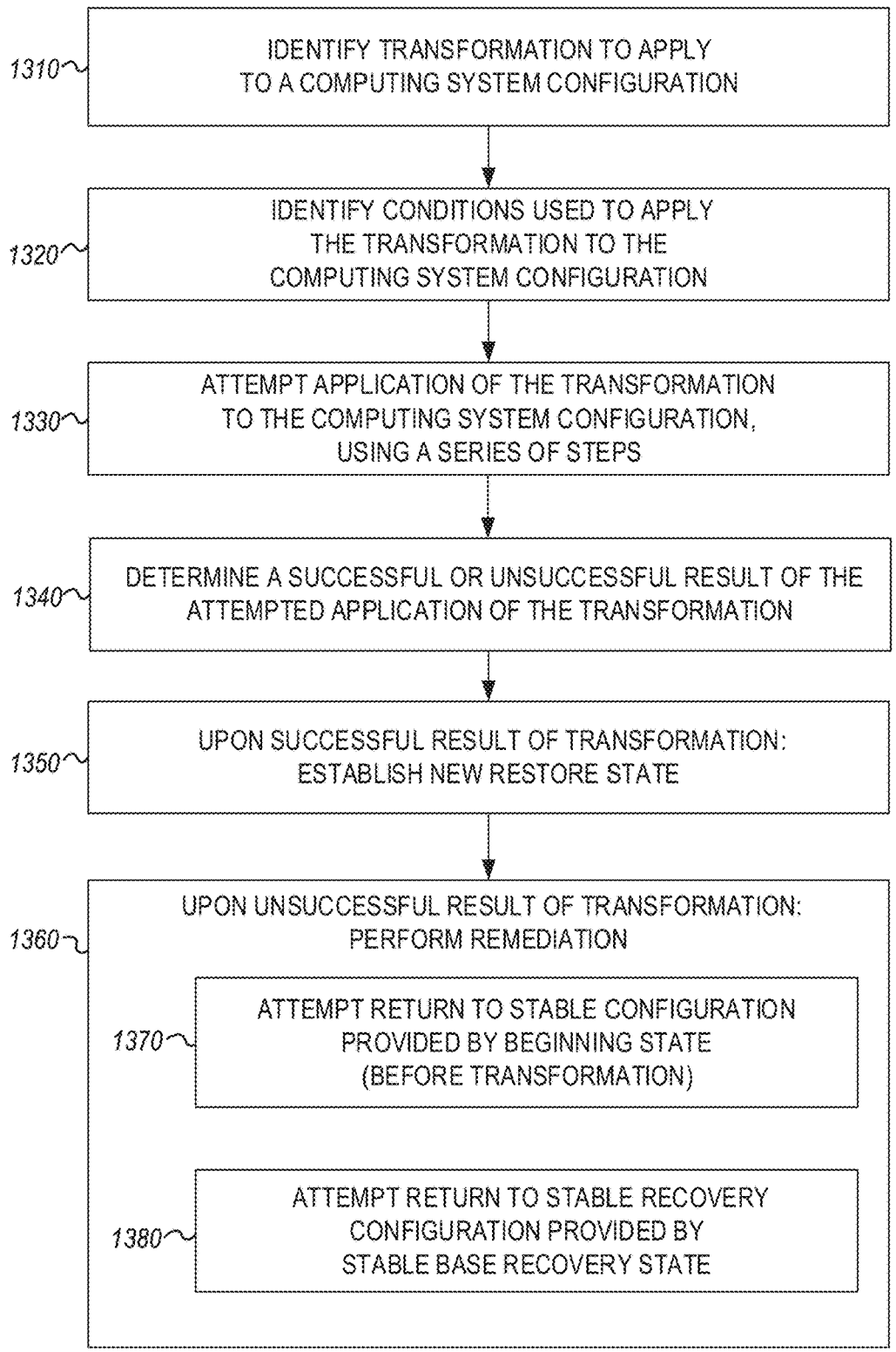
FIG. 13 illustrates a flowchart of example operations for monitoring and ensuring stable transformations of a computing system in an edge computing environment.

FIG. 13 illustrates a flowchart 1300 of an example process for implementing network transformations. This flowchart 1300 is depicted from the perspective of a computing system which attempts to apply transformation actions; it will be understood that operations from external computing systems, orchestration systems, monitoring systems, and other entities may also be involved. It will be understood that many aspects of the operations of flowchart 1300 may be provided from instructions that are executed, instantiated, controlled, or arranged via one or more components of processing circuitry, such as discussed with reference to the execution of machine readable instructions noted above.

At operation 1310, a transformation is identified or determined, for a transformation to be applied to a configuration of the computing system. In an example, the transformation is used to change, modify, update, upgrade, etc. the configuration from an initial (e.g., beginning, starting, or first) state to a completion (e.g., ending, final) state. Such a transformation may affect at least one network service provided by the computing system via the network communication circuitry, and thus the following operations are performed to ensure a successful application of the transformation (or, application of a restore store) so that the at least one network service can continue operation.

At operation 1320, one or more operational conditions are identified or determined, such as evaluative conditions that are used to evaluate and additionally to apply or control the transformation to the configuration of the computing system. In an example, the configuration of the computing system includes a software configuration or a hardware configuration used to provide the at least one network service. Thus, the transformation to the configuration of the computing system may comprise at least one of: an upgrade to the software configuration; an upgrade to firmware used with the hardware configuration; or a change to hardware of the computing system.

At operation 1330, the transformation (i.e., a configuration change) is attempted to be applied to the configuration of the computing system, using a series of stages (e.g., a sequence, or ordered set of steps or operations), such as those described with reference to FIGS. 8, 9, 11, and 12, above. In an example, the series of stages include corresponding rollback positions for the configuration of the computing system when one or more of the identified operational conditions are not satisfied. In an example, the series of stages and the operational conditions to be evaluated or satisfied (partially or fully satisfied) are defined in a smart contract provided by a trusted entity, and the series of stages includes verification of configuration changes produced or made at each of the series of stages. Further, each of the series of stages may include execution of a plurality of stability tests and stress tests, and other variations of basic or advanced tests, as discussed above. Further, each of the series of stages and conditions, defined in a smart contract, include the collection of measurements (such as, cryptographic hashes of updated configurations), digitally time-stamping and signing the measurements, and persisting the signed measurements in persistent memory and/or an append-only file or log (e.g., in partition 1010).

At operation 1340, a determination is made whether a successful or unsuccessful result has occurred, from the attempt to apply the transformation to the configuration of the computing system. Such a determination may be made by or in response to a monitor, which provides identification of the successful or unsuccessful result of the transformation to the configuration of the computing system. In an example, the monitor uses a timeout clock to determine the unsuccessful result of the transformation to the configuration.

At operation 1350, applicable upon (in response to) a successful result of the transformation, a new restore state is established from the completion state (the successful result of the transformation). Other service operations or features may also occur as a result of the successful result of the transformation.

At operation 1360, applicable upon (in response to) an unsuccessful result of the transformation, remediation may be performed. Such remediation may cause the computing system to perform at least one of: enter an offline state, perform a debugging operation, perform a repair operation, or perform an override operation, as suggested above.

At sub-operation 1370, the remediation causes the configuration of the computing system to return to a stable configuration provided by the initial state, before the transformation was attempted. At sub-operation 1380, the remediation causes the configuration of the computing system to return to a stable recovery configuration provided by a stable base recovery state. In an example, this stable base recovery state is provided from a stable base recovery partition on a storage device of the computing system. As depicted in FIG. 11, a storage device of the computing system may provide a plurality of partitions including: a production partition including a production image used to host data for the configuration of the computing system; a stable base configuration partition used to provide data for the initial state; and the stable base recovery partition.

In further examples, the series of stages and the conditions are defined in a smart contract provided by a trusted entity.

The series of stages then includes verification of configuration changes produced or made at each of the series of stages. Additional aspects of automation may be provided by the smart contract (or, other automated contracts) as discussed above. Additional aspects of saving, persisting, logging, or recording configuration states and changes may also be involved.

In further examples, the computing system performing operations of the flowchart 1300 comprises a cluster of a plurality of computing nodes. For instance, a computing system network communication circuitry and processing circuitry may be provided on a particular node of the plurality of computing nodes within a cluster, and used to apply transformation operations on a particular cluster. Further, the operations to identify a successful or unsuccessful result of the attempt to apply the transformation to the configuration of the computing system may include operations to evaluate results from tests performed on the particular node and on the cluster of the plurality of computing nodes. The use of such operations may allow for the consolidation of responsibilities or federating of cluster responsibilities into a set of nodes (including nodes that are themselves not subject to the transformation sequences).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: network communication circuitry; processing circuitry; and a memory device including instructions embodied thereon, wherein the instructions, which when executed by the processing circuitry, cause (e.g., via configuration, adaptation, instantiation, or otherwise) the processing circuitry to perform operations to: identify a transformation to apply to a configuration of the computing system, the transformation to change the configuration from an initial state to a completion state, wherein the transformation affects at least one network service provided by the computing system via the network communication circuitry; identify operational conditions used to evaluate results of the transformation to the configuration of the computing system; attempt to apply the transformation to the configuration of the computing system, using a series of stages, wherein the series of stages include corresponding rollback positions for the configuration of the computing system when one or more of the identified operational conditions are not satisfied; determine a successful or unsuccessful result of the attempt to apply the transformation to the configuration of the computing system; in response to the unsuccessful result of the transformation to the configuration of the computing system, perform remediation to the configuration of the computing system, the remediation including use of one or more of the rollback positions; and in response to the successful result of the transformation to the configuration of the computing system, establish a new restore state from the completion state.

In Example 2, the subject matter of Example 1 optionally includes subject matter where the series of stages and the operational conditions are defined in a smart contract provided by a trusted entity, and wherein the series of stages includes verification of configuration changes made at each of the series of stages.

In Example 3, the subject matter of any one or more of Examples 1-2 optionally include subject matter where the remediation causes the configuration of the computing system to return to a stable configuration provided by the initial state.

In Example 4, the subject matter of any one or more of Examples 1-3 optionally include subject matter where the remediation causes the configuration of the computing system to return to a stable recovery configuration provided by a stable base recovery partition on a storage device of the computing system.

In Example 5, the subject matter of Example 4 optionally includes subject matter where the storage device of the computing system comprises a plurality of partitions including: a production partition including a production image used to host data for the configuration of the computing system; a stable base configuration partition used to provide data for the initial state; and the stable base recovery partition.

In Example 6, the subject matter of any one or more of Examples 1-5 optionally include subject matter where the remediation causes the computing system to perform at least one of: enter an offline state, perform a debugging operation, perform a repair operation, or perform an override operation.

In Example 7, the subject matter of any one or more of Examples 1-6 optionally include subject matter where identification of the successful or unsuccessful result of the transformation to the configuration of the computing system is performed by a monitor.

In Example 8, the subject matter of Example 7 optionally includes subject matter where the monitor uses a timeout clock to determine the unsuccessful result of the transformation to the configuration.

In Example 9, the subject matter of any one or more of Examples 1-8 optionally include subject matter where each of the series of stages includes execution of a plurality of stability tests and stress tests.

In Example 10, the subject matter of any one or more of Examples 1-9 optionally include subject matter where the computing system comprises a cluster of a plurality of computing nodes, wherein the network communication circuitry and the processing circuitry are provided on a particular node of the plurality of computing nodes, and wherein the operations to identify a successful or unsuccessful result of the attempt to apply the transformation to the configuration of the computing system includes operations to evaluate results from tests performed on the particular node and on the cluster of the plurality of computing nodes.

In Example 11, the subject matter of any one or more of Examples 1-10 optionally include subject matter where the configuration of the computing system includes a software configuration or a hardware configuration used to provide the at least one network service.

In Example 12, the subject matter of Example 11 optionally includes subject matter where the transformation to the configuration of the computing system comprises at least one of: an upgrade to the software configuration; an upgrade to firmware used with the hardware configuration; or a change to hardware of the computing system.

Example 13 is at least one non-transitory machine-readable storage device comprising instructions stored thereupon, which when executed by processing circuitry of a computing system, cause the processing circuitry to perform operations that: identify a transformation to apply to a configuration of the computing system, the transformation to change the configuration from an initial state to a completion state, wherein the transformation affects at least one network service provided by the computing system; identify operational conditions used to evaluate results of the transformation to the configuration of the computing system; attempt to apply the transformation to the configuration of the computing system, using a series of stages, wherein the series of stages include corresponding rollback positions for the configuration of the computing system when one or more of the identified operational conditions are not satisfied; determine a successful or unsuccessful result of the attempt to apply the transformation to the configuration of the computing system; in response to the unsuccessful result of the transformation to the configuration of the computing system, perform remediation to the configuration of the computing system, the remediation including use of one or more of the rollback positions; and in response to the successful result of the transformation to the configuration of the computing system, establish a new restore state from the completion state.

In Example 14, the subject matter of Example 13 optionally includes subject matter where the series of stages and the operational conditions are defined in a smart contract provided by a trusted entity, and wherein the series of stages includes verification of configuration changes made at each of the series of stages.

In Example 15, the subject matter of any one or more of Examples 13-14 optionally include subject matter where the remediation causes the configuration of the computing system to return to a stable configuration provided by the initial state.

In Example 16, the subject matter of any one or more of Examples 13-15 optionally include subject matter where the remediation causes the configuration of the computing system to return to a stable recovery configuration provided by a stable base recovery partition on a storage device of the computing system.

In Example 17, the subject matter of Example 16 optionally includes subject matter where the storage device of the computing system comprises a plurality of partitions including: a production partition including a production image used to host data for the configuration of the computing system; a stable base configuration partition used to provide data for the initial state; and the stable base recovery partition.

In Example 18, the subject matter of any one or more of Examples 13-17 optionally include wherein the remediation causes the computing system to perform at least one of: enter an offline state, perform a debugging operation, perform a repair operation, or perform an override operation.

In Example 19, the subject matter of any one or more of Examples 13-18 optionally include subject matter where identification of the successful or unsuccessful result of the transformation to the configuration of the computing system is performed by a monitor.

In Example 20, the subject matter of Example 19 optionally includes subject matter where the monitor uses a timeout clock to determine the unsuccessful result of the transformation to the configuration.

In Example 21, the subject matter of any one or more of Examples 13-20 optionally include subject matter where each of the series of stages includes execution of a plurality of stability tests and stress tests.

In Example 22, the subject matter of any one or more of Examples 13-21 optionally include subject matter where the computing system comprises a cluster of a plurality of computing nodes, and wherein the operations to identify a successful or unsuccessful result of the attempt to apply the transformation to the configuration of the computing system includes operations to evaluate results from tests performed on individual nodes and on the cluster of the plurality of computing nodes.

In Example 23, the subject matter of any one or more of Examples 13-22 optionally include subject matter where the configuration of the computing system includes a software configuration or a hardware configuration used to provide the at least one network service.

In Example 24, the subject matter of Example 23 optionally includes subject matter where the transformation to the configuration of the computing system comprises at least one of: an upgrade to the software configuration; an upgrade to firmware used with the hardware configuration; or a change to hardware of the computing system.

Example 25 is a computing system apparatus, comprising: means for identifying a transformation to apply to a configuration of the computing system, the transformation to change the configuration from an initial state to a completion state, wherein the transformation affects at least one network service provided by the computing system; means for identifying operational conditions used to evaluate results of the transformation to the configuration of the computing system; means for attempting application of the transformation to the configuration of the computing system, using a series of stages, wherein the series of stages include corresponding rollback positions for the configuration of the computing system when one or more of the identified operational conditions are not satisfied; means for determining a successful or unsuccessful result of the attempt to apply the transformation to the configuration of the computing system; means for performing a response to the result of the attempt to apply the transformation, by: performing remediation to the configuration of the computing system in response to the unsuccessful result of the transformation to the configuration of the computing system, the remediation including use of one or more of the rollback positions, or establishing a new restore state from the completion state in response to the successful result of the transformation to the configuration of the computing system.

In Example 26, the subject matter of Example 25 optionally includes means for storing a plurality of partitions for the computing system, wherein a remediation causes the configuration of the computing system to return to a stable recovery configuration provided by a stable base recovery partition on a storage device of the computing system, and wherein the plurality of partitions includes: a production partition including a production image used to host data for the configuration of the computing system; a stable base configuration partition used to provide data for the initial state; and the stable base recovery partition.

Example 27 is a method for a stable transformation of a networked computing system, comprising: identifying a transformation to apply to a configuration of the computing system, the transformation to change the configuration from an initial state to a completion state, wherein the transformation affects at least one network service provided by the computing system; identifying operational conditions used to evaluate results of the transformation to the configuration of the computing system; attempting application of the transformation to the configuration of the computing system, using a series of stages, wherein the series of stages include corresponding rollback positions for the configuration of the computing system when one or more of the identified operational conditions are not satisfied; determining a successful or unsuccessful result of the attempt to apply the transformation to the configuration of the computing system; and performing a response to the result of the attempt to apply the transformation, the response including use or modification of one or more of the rollback positions.

In Example 28, the subject matter of Example 27 optionally includes subject matter where the response to the result of the attempt to apply the transformation comprises: performing remediation to the configuration of the computing system, the remediation including use of one or more of the rollback positions, in response to occurrence of the unsuccessful result of the transformation to the configuration of the computing system; wherein the remediation causes the configuration of the computing system to return to: a stable configuration provided by the initial state; or a stable recovery configuration provided by a stable base recovery partition on a storage device of the computing system, and optionally, where the storage device of the computing system comprises a plurality of partitions including: a production partition including a production image used to host data for the configuration of the computing system; a stable base configuration partition used to provide data for the initial state; and the stable base recovery partition.

In Example 29, the subject matter of Example 28 optionally includes subject matter where the operational conditions provide a plurality of measurements and test outcomes evaluated for the attempt to apply the transformation to the configuration of the computing system.

In Example 30, the subject matter of any one or more of Examples 28-29 optionally include subject matter where the remediation causes the computing system to perform at least one of: enter an offline state, perform a debugging operation, perform a repair operation, or perform an override operation.

In Example 31, the subject matter of any one or more of Examples 27-30 optionally include subject matter where the response to the result of the attempt to apply the transformation comprises: establishing a new restore state from the completion state, in response to occurrence of the successful result of the transformation to the configuration of the computing system.

In Example 32, the subject matter of any one or more of Examples 27-31 optionally include subject matter where the series of stages and the operational conditions are defined in a smart contract provided by a trusted entity, and wherein the series of stages includes verification of configuration changes made at each of the series of stages.

In Example 33, the subject matter of any one or more of Examples 27-32 optionally include subject matter where identification of the successful or unsuccessful result of the transformation to the configuration of the computing system is performed by a monitor.

In Example 34, the subject matter of Example 33 optionally includes subject matter where the monitor uses a timeout clock to determine the unsuccessful result of the transformation to the configuration.

In Example 35, the subject matter of any one or more of Examples 27-34 optionally include subject matter where each of the series of stages includes execution of a plurality of stability tests and stress tests.

In Example 36, the subject matter of any one or more of Examples 27-35 optionally include subject matter where the computing system comprises a cluster of a plurality of computing nodes, and wherein identifying a successful or unsuccessful result of the attempt to apply the transformation to the configuration of the computing system includes operations to evaluate results from tests performed on individual nodes and on the cluster of the plurality of computing nodes.

In Example 37, the subject matter of any one or more of Examples 27-36 optionally include subject matter where the configuration of the computing system includes a software configuration or a hardware configuration used to provide the at least one network service.

In Example 38, the subject matter of Example 37 optionally includes subject matter where the transformation to the configuration of the computing system comprises at least one of: an upgrade to the software configuration; an upgrade to firmware used with the hardware configuration; or a change to hardware of the computing system.

Example 39 is a multi-tier edge computing system, comprising a plurality of edge computing nodes provided among on-premise edge, network access edge, or near edge computing settings, the plurality of edge computing nodes configured, adapted, or instantiated to perform any of the transformation methods of Examples 1 to 38.

Example 40 is an edge computing system, comprising a plurality of edge computing nodes, each of the plurality of edge computing nodes that is configured, adapted, or instantiated to perform any of the transformation methods of Examples 1 to 38.

Example 41 is an edge computing node, operable in an edge computing system, comprising processing circuitry coupled to transformation method circuitry that is configured, adapted, or instantiated to implement any of the transformation methods of Examples 1 to 38.

Example 42 is an edge computing node, operable as a server hosting the service and a plurality of additional services in an edge computing system, that is configured, adapted, or instantiated to perform any of the transformation methods of Examples 1 to 38.

Example 43 is an edge computing node, operable in a layer of an edge computing network as an aggregation node, network hub node, gateway node, or core data processing node, that is configured, adapted, or instantiated to perform any of the transformation methods of Examples 1 to 38.

Example 44 is an edge computing network, comprising networking and processing components that are configured, adapted, or instantiated to provide or operate a communications network, to enable an edge computing system to implement any of the transformation methods of Examples 1 to 38.

Example 45 is an on-premise server, operable in a private communications network distinct from a public edge computing network, that is configured, adapted, or instantiated as an edge computing system to implement any of the transformation methods of Examples 1 to 38.

Example 46 is an edge computing system configured as an edge mesh, provided with a microservice cluster, a microservice cluster with sidecars, or linked microservice clusters with sidecars, that is configured, adapted, or instantiated to implement any of the transformation methods of Examples 1 to 38.

Example 47 is an edge computing system, comprising circuitry that is configured to implement services with one or more isolation environments provided among dedicated hardware, virtual machines, containers, or virtual machines on containers, the edge computing system configured, adapted, or instantiated to implement any of the transformation methods of Examples 1 to 38.

Example 48 is an edge computing system, comprising networking and processing components to communicate with a user equipment device, client computing device, provisioning device, or management device to implement any of the transformation methods of Examples 1 to 38.

Example 49 is networking hardware with network functions implemented thereupon, operable within an edge computing system, the network functions configured, adapted, or instantiated to implement any of the transformation methods of Examples 1 to 38.

Example 50 is an edge computing system that is configured, adapted, or instantiated to implement services with any of the transformation methods of Examples 1 to 38, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 51 is an apparatus of an edge computing system comprising: one or more processors and one or more computer-readable media comprising instructions that, when executed by the one or more processors, cause the one or more processors to perform any of the transformation methods of Examples 1 to 38.

Example 52 is one or more computer-readable storage media comprising instructions to cause an electronic device of an edge computing system, upon execution of the instructions by one or more processors of the electronic device, to perform any of the transformation methods of Examples 1 to 38.

Example 53 is a computer program used in an edge computing system, the computer program comprising instructions, wherein execution of the program by a processing element in the edge computing system is to cause the processing element to perform any of the transformation methods of Examples 1 to 38.

Example 54 is an edge computing appliance device operating as a self-contained processing system, comprising a housing, case or shell, network communication circuitry, storage memory circuitry, and processor circuitry, adapted to perform any of the transformation methods of Examples 1 to 38.

Example 55 is an apparatus of an edge computing system comprising means to perform any of the transformation methods of Examples 1 to 38.

Example 56 is an apparatus of an edge computing system comprising logic, modules, or circuitry to perform any of the transformation methods of Examples 1 to 38.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A computing system, comprising:
   network communication circuitry;
   processing circuitry; and
   a memory device including instructions embodied thereon, wherein the instructions, which when executed by the processing circuitry, cause the processing circuitry to perform operations to:
      identify a transformation to apply to a configuration of the computing system, the transformation to change the configuration from an initial state to a completion state, wherein the transformation affects at least one network service provided by the computing system via the network communication circuitry;

identify operational conditions used to evaluate results of the transformation to the configuration of the computing system;

attempt to apply the transformation to the configuration of the computing system, using a series of stages, wherein the series of stages include corresponding rollback positions for the configuration of the computing system when one or more of the identified operational conditions are not satisfied;

determine a successful or unsuccessful result of the attempt to apply the transformation to the configuration of the computing system;

in response to the unsuccessful result of the transformation to the configuration of the computing system, perform remediation to the configuration of the computing system, the remediation including use of one or more of the rollback positions; and in response to the successful result of the transformation to the configuration of the computing system, establish a new restore state from the completion state.

2. The computing system of claim 1, wherein the series of stages and the operational conditions are defined in a smart contract provided by a trusted entity, and wherein the series of stages includes verification of configuration changes made at each of the series of stages.

3. The computing system of claim 1, wherein the remediation causes the configuration of the computing system to return to a stable configuration provided by the initial state.

4. The computing system of claim 1, wherein the remediation causes the configuration of the computing system to return to a stable recovery configuration provided by a stable base recovery partition on a storage device of the computing system.

5. The computing system of claim 4, wherein the storage device of the computing system comprises a plurality of partitions including:

a production partition including a production image used to host data for the configuration of the computing system;

a stable base configuration partition used to provide data for the initial state; and the stable base recovery partition.

6. The computing system of claim 1, wherein the remediation causes the computing system to perform at least one of: enter an offline state, perform a debugging operation, perform a repair operation, or perform an override operation.

7. The computing system of claim 1, wherein identification of the successful or unsuccessful result of the transformation to the configuration of the computing system is performed by a monitor.

8. The computing system of claim 7, wherein the monitor uses a timeout clock to determine the unsuccessful result of the transformation to the configuration.

9. The computing system of claim 1, wherein each of the series of stages includes execution of a plurality of stability tests and stress tests.

10. The computing system of claim 1, wherein the computing system comprises a cluster of a plurality of computing nodes, wherein the network communication circuitry and the processing circuitry are provided on a particular node of the plurality of computing nodes, and wherein the operations to identify a successful or unsuccessful result of the attempt to apply the transformation to the configuration of the computing system includes operations to evaluate results from tests performed on the particular node and on the cluster of the plurality of computing nodes.

11. The computing system of claim 1, wherein the configuration of the computing system includes a software configuration or a hardware configuration used to provide the at least one network service.

12. The computing system of claim 11, wherein the transformation to the configuration of the computing system comprises at least one of:

an upgrade to the software configuration;

an upgrade to firmware used with the hardware configuration; or a change to hardware of the computing system.

13. At least one non-transitory machine-readable storage device comprising instructions stored thereupon, which when executed by processing circuitry of a computing system, cause the processing circuitry to perform operations that:

identify a transformation to apply to a configuration of the computing system, the transformation to change the configuration from an initial state to a completion state, wherein the transformation affects at least one network service provided by the computing system;

identify operational conditions used to evaluate results of the transformation to the configuration of the computing system;

attempt to apply the transformation to the configuration of the computing system, using a series of stages, wherein the series of stages include corresponding rollback positions for the configuration of the computing system when one or more of the identified operational conditions are not satisfied;

determine a successful or unsuccessful result of the attempt to apply the transformation to the configuration of the computing system;

in response to the unsuccessful result of the transformation to the configuration of the computing system, perform remediation to the configuration of the computing system, the remediation including use of one or more of the rollback positions; and in response to the successful result of the transformation to the configuration of the computing system, establish a new restore state from the completion state.

14. The machine-readable storage device of claim 13, wherein the series of stages and the operational conditions are defined in a smart contract provided by a trusted entity, and wherein the series of stages includes verification of configuration changes made at each of the series of stages.

15. The machine-readable storage device of claim 13, wherein the remediation causes the configuration of the computing system to:

return to a stable configuration provided by the initial state;

return to a stable recovery configuration provided by a stable base recovery partition on a storage device of the computing system; or perform at least one of: enter an offline state, perform a debugging operation, perform a repair operation, or perform an override operation.

16. The machine-readable storage device of claim 15, wherein the storage device of the computing system comprises a plurality of partitions including:

a production partition including a production image used to host data for the configuration of the computing system;

a stable base configuration partition used to provide data for the initial state; and the stable base recovery partition.

17. The machine-readable storage device of claim 13, wherein identification of the successful or unsuccessful result of the transformation to the configuration of the computing system is performed by a monitor.

18. The machine-readable storage device of claim 17, wherein the monitor uses a timeout clock to determine the unsuccessful result of the transformation to the configuration.

19. The machine-readable storage device of claim 13, wherein each of the series of stages includes execution of a plurality of stability tests and stress tests.

20. The machine-readable storage device of claim 13, wherein the configuration of the computing system includes a software configuration or a hardware configuration used to provide the at least one network service.

21. The machine-readable storage device of claim 20, wherein the transformation to the configuration of the computing system comprises at least one of:

an upgrade to the software configuration;

an upgrade to firmware used with the hardware configuration; or a change to hardware of the computing system.

22. A method for a stable transformation of a networked computing system, comprising:

identifying a transformation to apply to a configuration of the computing system, the transformation to change the configuration from an initial state to a completion state, wherein the transformation affects at least one network service provided by the computing system;

identifying operational conditions used to evaluate results of the transformation to the configuration of the computing system;

attempting application of the transformation to the configuration of the computing system, using a series of stages, wherein the series of stages include corresponding rollback positions for the configuration of the computing system when one or more of the identified operational conditions are not satisfied;

determining a successful or unsuccessful result of the attempt to apply the transformation to the configuration of the computing system; and performing a response to the result of the attempt to apply the transformation, the response including use or modification of one or more of the rollback positions.

23. The method of claim 22, wherein the response to the result of the attempt to apply the transformation comprises:

performing remediation to the configuration of the computing system, the remediation including use of one or more of the rollback positions, in response to occurrence of the unsuccessful result of the transformation to the configuration of the computing system;

wherein the remediation causes the configuration of the computing system to return to:

a stable configuration provided by the initial state; or a stable recovery configuration provided by a stable base recovery partition on a storage device of the computing system.

24. The method of claim 22, wherein the operational conditions provide a plurality of measurements and test outcomes evaluated for the attempt to apply the transformation to the configuration of the computing system.

25. The method of claim 22, wherein the response to the result of the attempt to apply the transformation comprises:

establishing a new restore state from the completion state, in response to occurrence of the successful result of the transformation to the configuration of the computing system.

\* \* \* \* \*